United States Patent
Athley et al.

(10) Patent No.: US 10,855,391 B2
(45) Date of Patent: Dec. 1, 2020

(54) METHOD AND DEVICE FOR ANALOG BEAMFINDING

(71) Applicant: Telefonaktiebolaget LM Ericsson (publ), Stockholm (SE)

(72) Inventors: Fredrik Athley, Kullavik (SE); Andreas Nilsson, Gothenburg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/628,487

(22) PCT Filed: Jul. 5, 2017

(86) PCT No.: PCT/EP2017/066796
§ 371 (c)(1),
(2) Date: Jan. 3, 2020

(87) PCT Pub. No.: WO2019/007500
PCT Pub. Date: Jan. 10, 2019

(65) Prior Publication Data
US 2020/0186272 A1    Jun. 11, 2020

(51) Int. Cl.
*H04B 7/08*    (2006.01)
*H04W 16/28*    (2009.01)
(Continued)

(52) U.S. Cl.
CPC ........ *H04J 11/0086* (2013.01); *H04B 7/0408* (2013.01); *H04B 7/088* (2013.01); *H04W 16/28* (2013.01)

(58) Field of Classification Search
CPC ... H04J 11/0086; H04B 7/0408; H04B 7/088; H04W 16/28
See application file for complete search history.

(56) References Cited

U.S. PATENT DOCUMENTS 9,456,357 B2    9/2016    Vitek
2018/0191065 A1*    7/2018    Ma ........................... H01Q 3/36
(Continued)

FOREIGN PATENT DOCUMENTS

WO    2015190648 A1    12/2015
WO    2016032294 A1    3/2016

OTHER PUBLICATIONS

International Search Report and the Written Opinion of the International Searching Authority, issued in corresponding International Application No. PCT/EP2017/066796, dated Mar. 22, 2018, 12 pages.
(Continued)

*Primary Examiner* — Ted M Wang
(74) *Attorney, Agent, or Firm* — Rothwell, Figg, Ernst & Manbeck, P.C.

(57) ABSTRACT

A method (30) for analog beamfinding performed by a device (1, 2) is provided. The method (30) comprises performing (31) one or more one-dimensional beam sweeps in a first direction, performing (32) one or more one-dimensional beam sweeps in a second direction, and determining (33) a two-dimensional beam based on at least one one-dimensional sweep in the first direction and at least one one-dimensional sweep in the second direction. A corresponding device (1, 2), computer program (42) and computer program product (41) are also provided.

13 Claims, 3 Drawing Sheets

(51) Int. Cl.
   *H04J 11/00*    (2006.01)
   *H04B 7/0408*   (2017.01)

(56) References Cited

U.S. PATENT DOCUMENTS

2019/0199410 A1\* 6/2019 Zhao .................... H04B 7/0456
2020/0059398 A1\* 2/2020 Pan ..................... H04L 41/0654

OTHER PUBLICATIONS

3GPP 3rd Generation Partnership Project; Technical Specification Group Radio Access Network; Study on channel model for frequency spectrum above 6 GHz (Release 14), 3GPP TR 38.900 V14.1.0 (Sep. 2016), 81 pages.

Zte et al. "Further clarification on assumptions for Phase 1 NR-MIMO calibration" 3GPP TSG RAN WG1 Meeting #86bis, R1-1610890, Lisbon, Portugal, Oct. 10-14, 2016, 6 pages.

\* cited by examiner

METHOD AND DEVICE FOR ANALOG BEAMFINDING

CROSS REFERENCE TO RELATED APPLICATION(S)

This application is a 35 U.S.C. § 371 National Phase Entry Application from PCT/EP2017/066796, filed Jul. 5, 2017, designating the United States, the disclosure of which is incorporated herein by reference in its entirety.

TECHNICAL FIELD

The technology disclosed herein relates generally to the field of antenna technology, and in particular to a method for analog beamfinding, and a corresponding device, computer program and computer program product.

BACKGROUND

There is a large variety of requirements for the next generation of mobile communications system (5G). This implies that frequency bands at many different carrier frequencies will be needed. For example, low bands will be needed in order to achieve sufficient coverage and higher bands (e.g. mmW, i.e. near and above 30 GHz) will be needed to reach the required capacity. At high frequencies the propagation properties are more challenging and beamforming both at a transmission/reception point (TRP, e.g. an access point such as a base station) and at a communication device, e.g. a user equipment (UE) might be required in order to reach sufficient link budget.

There are basically three different implementations of beamforming, both at the TRP and at the UE: analog beamforming, digital beamforming and hybrid beamforming. Each implementation has its advantages and disadvantages. Digital beamforming is the most flexible solution but also the most expensive due to the large number of required radios and baseband chains. Analog beamforming is the least flexible but less costly to manufacture owing to reduced number of radio and baseband chains. Hybrid beamforming is a compromise between the analog and digital beamforming. One type of hybrid beamforming antenna architecture that has been agreed to study in $3^{rd}$ Generation Partnership Project (3GPP) for the New Radio (NR) access technology in 5G is the concept of antenna panels. A panel is a rectangular antenna array of dual-polarized elements with typically one transmit/receive unit (TXRU) per polarization. An analog distribution network with phase shifters is used to steer the beam of each panel. Multiple panels can be stacked next to each other and digital beamforming can be performed across the panels.

Beam management is currently being discussed in 3GPP. A purpose of beam management is to keep track of UEs communicating with narrow beams. The narrow beams are used in order to increase the coverage and throughput. Due to UE rotation, UE movement and blockage, the beam (at the TRP and/or UE) needs to be updated dynamically in order to maintain good channel quality between the TRP and the UE. This can be achieved by transmitting, from one end of the link between the TRP and the UE, reference signals in each candidate analog beam direction and then measuring the received power for each candidate beam direction in the other end of the link. The beam pair (beam at TRP and beam at UE) for which the highest received reference signal power was obtained is then used as the active beam pair link. In case a UE looses beam connection with a TRP, for example due to blockage, a beam recovery procedure can be initiated to re-establish the beam connection. Such beam recovery procedure can, for instance, comprise sweeping through all different combinations of TRP beams and UE beams. When there are many candidate beams at both the TRP and the UE, such beam sweeping procedure can be very costly in terms of time consumption and overhead signaling. In NR a UE can be connected to different TRPs in downlink and uplink, which may require separate beam management procedures for downlink and uplink.

Beam finding requires large overhead signaling and can be time consuming, especially for analog and hybrid antenna array implementations where beams have to be swept in a sequential manner. If panels with analog beamforming is used at both the TRP and the UE this becomes even more challenging since, in an exhaustive beam search, for each TRP beam all candidate beams at the UE need to be tested. As an example, a case with a TRP having a single panel with 8×8 (vertical×horizontal) antenna elements and a UE having a single panel with 4×4 antenna elements is considered. Furthermore, if it is assumed that beams should be chosen from a beam grid obtained by a 2-D discrete Fourier transform (DFT) beamforming matrix, then there will be 64 candidate beams at the TRP and 16 candidate beams at the UE to choose among. In general, without any restrictive assumptions, all possible combinations of TRP and UE beam need to be tested. This means that 64×16=1024 different beam pairs need to be tested. If one beam per Orthogonal frequency-division multiplexing (OFDM) can be tested, this means that 1024 OFDM symbols are required to perform an exhaustive beam search. This may be an unacceptable search time and amount of overhead.

SUMMARY

An objective of the present disclosure is to address and improve various aspects for beamforming. A particular objective is to enable reduced signaling overhead and shorter search time in analog beam finding, in particular two dimensional (2-D) analog beam finding. This objective and others are achieved by the methods, devices, computer programs and computer program products according to the appended independent claims, and by the embodiments according to the dependent claims.

The objective is according to an aspect achieved by a method for analog beamfinding performed by a device. The method comprises: performing one or more one-dimensional beam sweeps in a first direction, performing one or more one-dimensional beam sweeps in a second direction, and determining a two-dimensional beam based on at least one one-dimensional sweep in the first direction and at least one one-dimensional sweep in the second direction.

The method provides a number of advantages, and an important advantage is the reduced signaling overhead and time required for the beam finding.

The objective is according to an aspect achieved by a computer program for a device. The computer program comprises computer program code, which, when run on at processing circuitry of the device causes the device to perform the method as above.

The objective is according to an aspect achieved by a computer program product comprising a computer program as above and a computer readable means on which the computer program is stored.

The objective is according to an aspect achieved by a device for analog beamfinding. The device is configured to: perform one or more one-dimensional beam sweeps in a first direction, perform one or more one-dimensional beam sweeps in a second direction, and determine a two-dimensional beam based on at least one one-dimensional sweep in the first direction and at least one one-dimensional sweep in the second direction.

Further features and advantages of the embodiments of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, in various aspects of the present teachings, the prior art two-dimensional (2-D) beam sweeping procedure is replaced by two sequential one-dimensional (1-D) beam sweeps. If multiple antenna panels (also denoted simply panels in the following) are used and if same beam pair selection should be used for all panels, the sequential sweeps can be replaced by parallel sweeps. For example, if two panels are used, one of the panels may be used for sweeping beams in the vertical dimension while the other panel is used for simultaneously sweeping beams in the horizontal dimension. When performing the beam sweep in one dimension, the beam is preferably broadened in the orthogonal dimension in order to cover larger area. The best beams from the two 1-D beam sweeps are subsequently used in order to determine the best 2-D beam.

Figure 1:
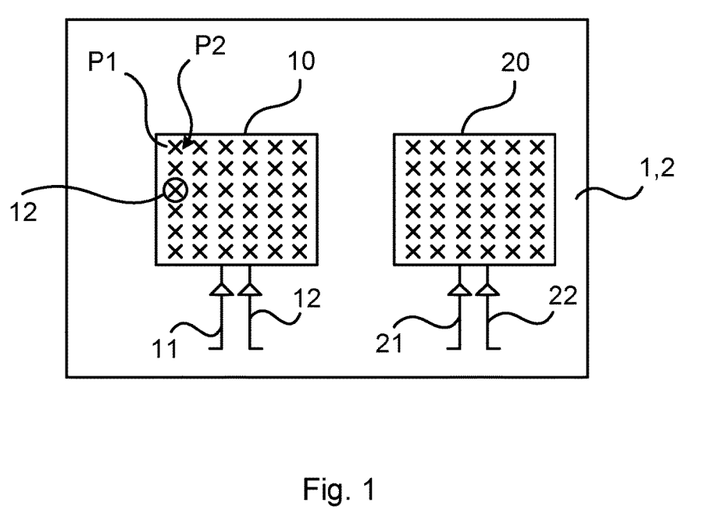
FIG. 1 illustrates an antenna panel.

FIG. 1 illustrates antenna panels, and in particular an example with two panels. In this context, and for sake of completeness, it is noted that beamforming may be defined as a signal processing technique used in the panels for directional signal transmission or reception. Each panel 10, 20 comprises a number of dual-polarized elements (one such element indicated at 12), and each polarization P1, P2 is connected to a respective TXRU 11, 12; 21, 22. It is noted that the panels 10, 20 may be arranged in or connected to a communication device 1 and/or in a TRP 2. The communication device 1 may for instance, be a UE, e.g. a mobile phone or a smart phone, a tablet computer or the like. The TRP 2 may, for instance, be an access point such as base station, evolved eNode B, eNB, gNB etc. It is further noted that the methods presented herein may be implemented not only between e.g. a UE 1 and a base station, but equally well between e.g. two mobile or stationary base stations having a wireless backhaul link between them.

Figure 2:
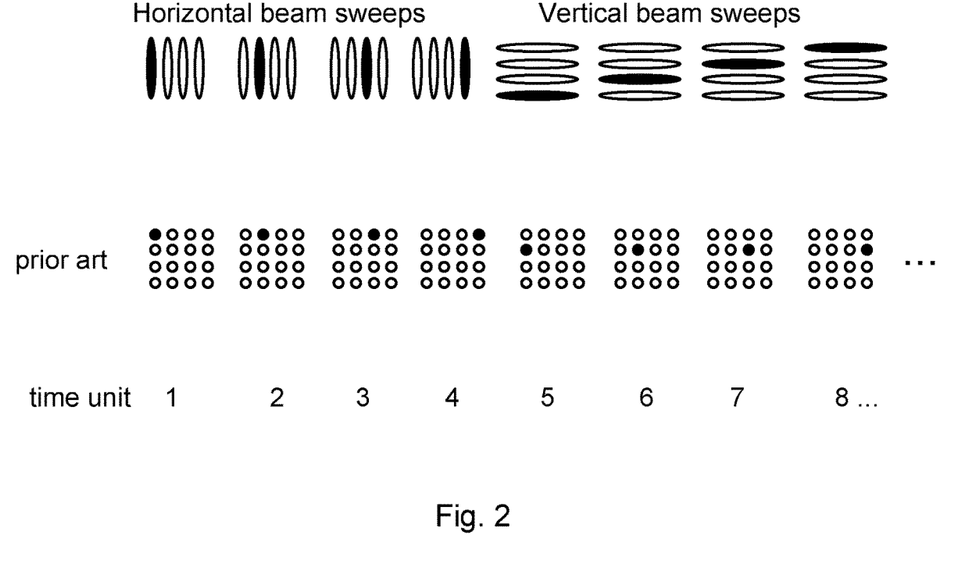
FIG. 2 is an illustration comparing prior art and aspects of the present teachings.

FIG. 2 is an illustration comparing prior art and aspects of the present teachings. The present teachings aim, inter alia, at finding ways to reduce the time and signaling overhead that is required for finding the most suitable or best 2-D beam for use in communication between the UE 1 and the TRP 2. This may, as mentioned earlier, be accomplished by performing sequential or parallel 1-D beam searches. "Best" may here mean, e.g. highest received power of a transmitted beam reference signal, (Reference Signal Received Power, RSRP), e.g. beamformed Channel State Information Reference Signal (CSI-RS).

In FIG. 2, a sequential search according to prior art (illustrated in middle part of FIG. 2) and a sequential search according to the present teachings (uppermost part of FIG. 2) are illustrated for an example with a 4×4 beam grid.

According to prior art, a narrow 2-D beam is evaluated for each time unit (indicated bottommost in FIG. 2). The time unit may, for instance, be one OFDM symbol, or a subunit of an OFDM symbol, or any other time unit. This prior art way would require 16 time units to test all beams in the beam grid: during a first time unit a first 2-D candidate beam (indicated by filled circle) is evaluated, during a second time unit a second 2-D candidate beam is evaluated, and so on until all 16 candidate beams (only the 8 first candidate beams are shown in the FIG. 2) have been evaluated, after which the best one is selected.

In contrast, and according to the present teachings, a beam sweep in the horizontal dimension may be performed first, followed by a beam sweep in the vertical dimension, as shown in the uppermost part of FIG. 2. It is noted that many other beam sweeping orders are possible, e.g. beam sweeps may be performed in the vertical direction first followed by horizontal beam sweeps, or the beam sweeps may be performed such that every other is in the horizontal and vertical directions, or in any other order. During the horizontal beam sweep, the vertical beamwidth is adjusted so that it covers the angular sector of interest in the vertical dimension and vice versa for the vertical beam sweep, i.e. the horizontal beamwidth is adjusted so that it covers the angular sector of interest in the horizontal dimension. The best horizontal beam and the best vertical beam are then used for estimating the best 2-D beam (such estimation described later, reference is made e.g. to FIG. 3). In this illustrated case, only 8 time units are needed to find the best 2-D beam, i.e. 50% less than the prior art sweeping procedure. The reduction in beam search time and overhead with the herein provided method is larger the larger the antenna panel/beam grid is, since the required number of time units grows as $O(N^2)$ for the prior art solution and as $O(2N)$ for the method presented herein in case of a square beam grid (N vertical and N horizontal beams). Hence, the search time can be reduced by a factor N/2 with the provided method.

Figure 3:
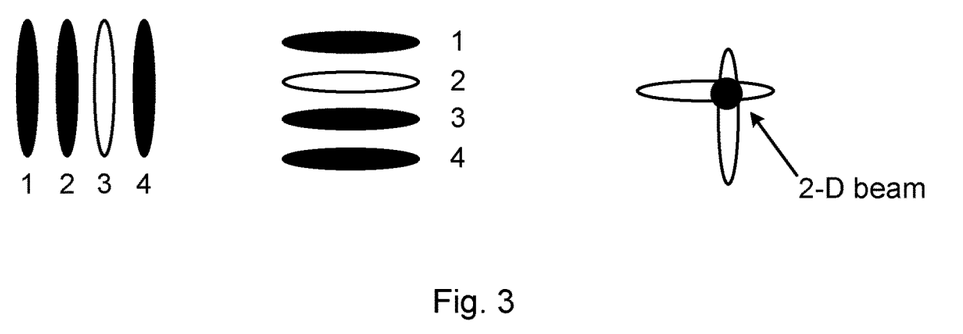
FIG. 3 illustrates combining of two one-dimensional beam sweeps for obtaining one two-dimensional beam.

FIG. 3 illustrates a combination of two 1-D beam sweeps for obtaining one 2-D beam. According to various embodiments of the method, the result from the two 1-D beam sweeps are combined such that an estimate of the best 2-D beam is obtained, of which the best 2-D beam is to be used in the data transmission/reception. In the example shown in FIG. 3, four 1-D beam sweeps is performed in the horizontal direction and four 1-D beam sweeps is performed in the vertical direction. The best beam in each sweep is determined: the horizontal beam number 3 and the vertical beam number 2. The pointing directions of these beams are used to determine the best 2-D beam, illustrated to the right in FIG. 3. Hence, the horizontal pointing direction of the chosen 2-D beam is given by the pointing direction of horizontal beam number 3 and the vertical pointing direction by the pointing direction of vertical beam number 2.

In various embodiments, if there is angular spread in a channel such that the horizontal and vertical dimensions are not completely separable, the 2-D beam that is estimated from the described procedure can be refined by doing a local 2-D beam search using a few 2-D beams around the initial estimate. The herein presented method will still have a reduced signaling overhead as well as being faster compared to prior art.

Figure 4:
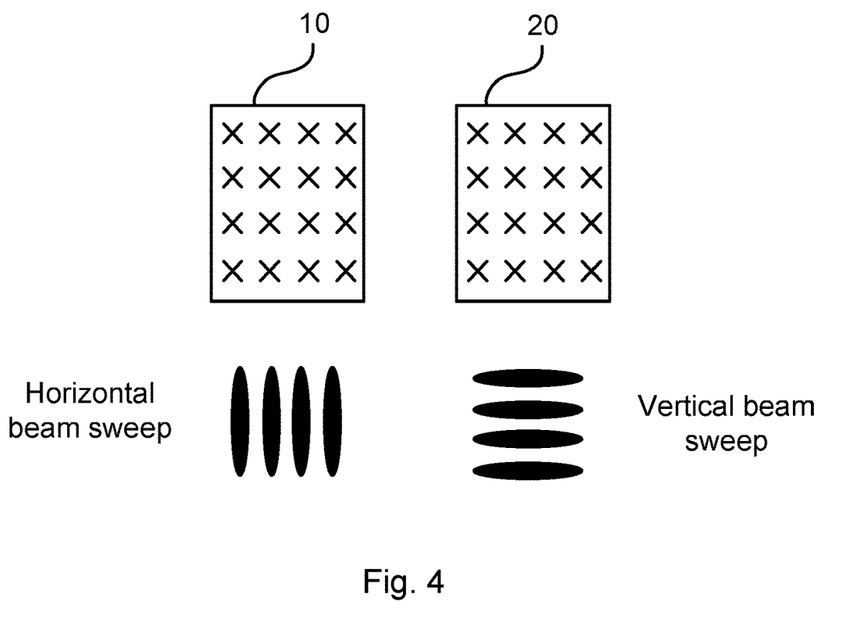
FIG. 4 illustrates an exemplary antenna system comprising two analog panels.

FIG. 4 illustrates an exemplary antenna system comprising two analog panels 10, 20. In this example, the first panel 10 is used for performing a horizontal beam sweep while the second panel 20 simultaneously performs a vertical beam sweep. When the first panel 10 is performing the horizontal beam sweep, the vertical beamwidth is adjusted so that it covers the angular sector of interest in the vertical dimension and vice versa for the second panel 20. In this example, 4 beams per panel need to be tested with the herein described method. This beam sweep procedure may therefore be performed in only 4 OFDM symbols if one beam is tested per OFDM symbol. If a full 2-D beam sweep instead were to be performed, 16 beams would need to be tested. This would require 8 OFDM symbols if two different 2-D beams are tested simultaneously in the two panels 10, 20 (e.g. using orthogonal time-frequency resource elements). It is noted that the relative gain in search time with the provided method does not depend on the number of panels, only on the number of antenna elements (beams) per panel.

Figure 5:
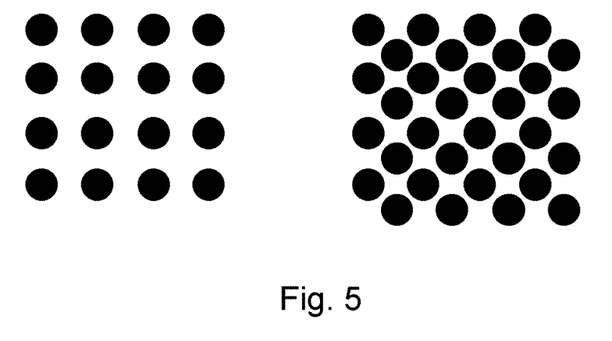
FIG. 5 illustrates prior art 2-D beam sweeps corresponding to example in FIG. 4.

FIG. 5 illustrates the corresponding prior art 2-D beam sweeps (leftmost part of FIG. 5). However, such a beam lattice has very low gain in the middle between four adjacent beams which may lead to high straddling losses. Therefore it may be necessary to apply a staggered beam lattice, which is also illustrated in FIG. 5 (rightmost part). This would require 32 beams to be tested, resulting in an even longer beam search time. According to the present teachings the beam broadened in one dimension slightly reduces the antenna gain, but as noted, such antenna gain losses exist also for the prior art solution. The method according to the present teachings provides highly reduced signaling overhead and much shorter search time compared to the known methods.

Depending on the particular antenna architecture implementation at hand, the beamwidth adjustment (in the dimension orthogonal to the sweeping dimension) can be performed by phase and/or amplitude tapering. In other embodiments, a dual-polarization beamforming technique may be used, such as described e.g. in WO2016/141961.

Determination of the adjusted beamwidth can be determined based on one or more of the following factors:

The angular interval within which the beam sweep in the orthogonal dimension should be performed.

An angular sector within which all or almost all UEs to be served are located. This may be determined a priori by cell planning, or based on measured statistics during network operation.

Based on link budget/channel conditions. Since the antenna gain depends on the beamwidth, link budget may be taken into account so that a beam broadening does not cause loss of coverage due to low gain. For UEs with a poor link, it may be necessary to divide the orthogonal dimension into angular subintervals which are swept sequentially. This division can be made so that the antenna gain is similar in the horizontal and vertical beam sweeps. Since the coverage is determined by the total transmitted/received energy there is an inherent trade-off between beam sweep time and coverage. With the herein presented teachings, the optimal trade-off can be found by adjusting the beamwidth in the dimension orthogonal to the sweep dimension to the current channel conditions.

The provided method can be applied on transmission, on reception or both. Applying the method at both the transmitter side and receiver side will reduce search time and overhead further still compared to the prior art solution (product of the relative gain at the receiver and relative gain at the transmitter). The method may also be used in any network node or device, e.g. a base station or a UE.

Various features and embodiments have been described for finding best 2-D beam in 2-D analog beam finding by performing 1-D beam sweeps and combining the best 1-D beams to an estimate of the best 2-D beam. The beams in the 1-D beam sweeps may preferably be narrow in the sweep dimension and broadened in the orthogonal dimension. The beam broadening may be achieved by amplitude/phase tapering or dual-polarization beamforming. These features and embodiments may be combined in many different ways, examples of which are given next.

Figure 6:
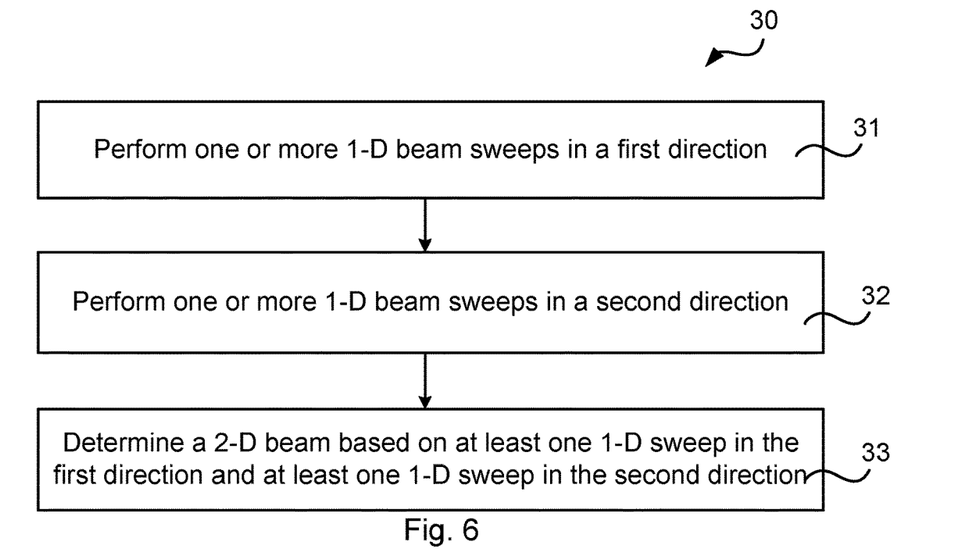
FIG. 6 is a flow chart over steps of an embodiment of a method in a device in accordance with the present teachings.

FIG. 6 is a flow chart over steps of an embodiment of a method in a device 1, 2 in accordance with the present teachings. A method 30 of analog beamfinding is, in various embodiments, provided herein. The method 30 may be performed by a device 1, 2. The device 1, 2 may, as described earlier, be any transmitting and/or receiving device, e.g. an access point 2 for wireless communication (base station, eNB, etc.) or a communication device 1 (UE, smart phone, tablet computer etc.). As also described earlier, the method 30 may be applied on transmission and/or reception, and it may also be applied both at the transmitter side as well as the receiving side, which reduces search time and overhead signaling even further compared to prior art.

The method 30 comprises performing 31 one or more one-dimensional beam sweeps in a first direction.

The method 30 comprises performing 32 one or more one-dimensional beam sweeps in a second direction.

The method 30 comprises determining 33 a two-dimensional beam based on at least one one-dimensional sweep in the first direction and at least one one-dimensional sweep in the second direction.

The method 30 gives a highly reduced beam search time as well as reduced overhead signaling.

In an embodiment, the determining 33 comprises:

selecting one of the one-dimensional beam sweeps in the first direction and one one-dimensional beam sweep in the second direction, and determining a pointing direction for use in transmission or reception based on the respective pointing directions of the selected one-dimensional beams.

As has been described earlier (e.g. in relation to FIG. 3), the determining 33 of the two-dimensional beam may, for instance, comprise setting its horizontal pointing direction to the pointing direction of the first beam and its vertical pointing direction to the pointing direction of the second beam.

In various embodiments, the method 30 comprises refining the determined two-dimensional beam by performing a two-dimensional beamsearch using one or more two-dimensional beams based on the determined two-dimensional beam. The determined two-dimensional beam may thus, as described earlier, be a starting point for performing only a few two-dimensional beam searches. The one or few two-dimensional beam searches may be made close to the determined two-dimensional beam. Such embodiments still requires a much shorter time than prior art methods, since fewer two-dimensional beam sweeps are needed.

In various embodiments, the method 30 comprises using a first analog antenna panel 10 for the one-dimensional beam sweeps in the first direction and a second analog antenna panel 20 for the one-dimensional beam sweeps in the second direction.

In various embodiments, the method 30 comprises simultaneously performing 31, 32 the one or more one-dimensional beam sweeps in the first direction and in the second direction. For instance, one of the panels 10 may be used for sweeping beams in the vertical direction while the other panel 20 is simultaneously used for sweeping beams in the horizontal direction.

In various embodiments, the performing 31 comprises adjusting beamwidth of the one-dimensional beam sweeps in a direction essentially orthogonal to the first direction.

In various embodiments, the performing 32 comprises adjusting beamwidth of the one-dimensional beam sweeps in a direction essentially orthogonal to the second direction.

A good trade-off between beam sweep time and coverage can hence be determined by adjusting the beamwidth in the dimension orthogonal to the respective sweep direction to the current channel conditions.

In various embodiments, the adjusting comprises one or more of: an angular interval within which the beam sweep in the orthogonal direction is to be performed, link budget and channel conditions on a channel to which the device 1, 2 has a wireless link.

In other embodiments, when the device is an access point 2 the adjusting may be based on an angular sector within which all or almost all communications devices it is to serve are located. This may then, as mentioned earlier, be determined a priori by cell planning, or based on measured statistics during network operation. That is, in various embodiments, the device is an access point 2, and the adjusting is based on an angular sector within which a number of communications devices 1 to be served by the access point 2 are located. The number of communication devices 1 is then preferably high, preferably a majority of all communications devices 1 to be served by the access point 2.

In various embodiments, the first direction is essentially orthogonal to the second direction. The angle between the first direction and the second direction is preferably 90°, i.e. the directions are preferably orthogonal. However, the angle may, for instance, be within the interval of 90°±5°.

In various embodiments, a beamwidth of the one-dimensional beam sweeps is broader in a direction orthogonal to a sweep direction than in the sweep direction.

In various embodiments, the performing 31, 32 comprises broadening the one-dimensional beam sweeps in a direction orthogonal to the first direction and the second directions, respectively, by using one or more of: amplitude tapering, phase tapering and dual-polarization beamforming.

In various embodiments, the device 1, 2 is a wireless communication device 1.

In various embodiments, the device 1, 2 is an access point (2) for wireless communications.

The method 30 may also be performed by the transmitting and receiving side, e.g. both in an access point 2 for wireless communications and in a wireless communication device 1.

Figure 7:
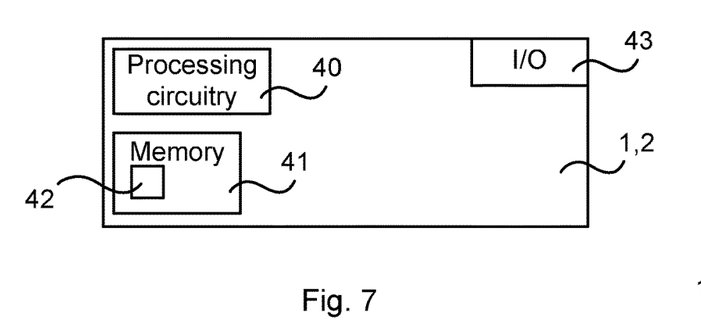
FIG. 7 illustrates a device and means for implementing embodiments in accordance with the present teachings.

FIG. 7 illustrates a device and means for implementing embodiments in accordance with the present teachings.

The device 1, 2 comprises processing circuitry 40, which may be any combination of one or more of a suitable central processing unit (CPU), multiprocessor, microcontroller, digital signal processor (DSP), etc., capable of executing software instructions stored in a computer program product 41, e.g. in the form of a storage medium 41. The processing circuitry 40 may further be provided as at least one application specific integrated circuit (ASIC), or field programmable gate array (FPGA).

The processing circuitry 40 is configured to cause the device 1, 2 to perform a set of operations, or steps, e.g. as described in relation to FIG. 3. For example, the storage medium 41 may store the set of operations, and the processing circuitry 40 may be configured to retrieve the set of operations from the storage medium 41 to cause the device 1, 2 to perform the set of operations. The set of operations may be provided as a set of executable instructions. The processing circuitry 40 is thereby arranged to execute methods as disclosed herein.

The device 1, 2 also comprises input/output means 43 (denoted I/O) for communicating wirelessly and/or in a wired manned with other entities and devices. The input/output means 43 may, for instance, comprise a protocol stack, for communication with network nodes in a wired manner and/or with communication devices in a wireless manner. The input/output means 43 may be used for receiving data input and for outputting data, e.g. conveying IP packets. The device 1, 2 may comprise receiving circuitry and transmitting circuitry. The device 1, 2 also comprises or is connected to one or more analog antenna panels 10, 20, for communication over a wireless link.

A device 1, 2 for analog beamfinding is provided. The device 1, 2 is configured to:
  perform one or more one-dimensional beam sweeps in a first direction,
  perform one or more one-dimensional beam sweeps in a second direction, and
  determine a two-dimensional beam based on at least one one-dimensional sweep in the first direction and at least one one-dimensional sweep in the second direction.

The device 1, 2 may be configured to perform the above steps, and implement any of the described embodiments of e.g. the method 30, e.g. by comprising one or more processors 40 (or processing circuitry) and memory 41, the memory 41 containing instructions executable by the processor 40, whereby the device 1, 2 is operative to perform the steps.

In an embodiment thus, a device 1, 2 is provided, for analog beamfinding. The device 1, 2 comprises one or more processors 40 and memory 41, the memory 41 containing instructions executable by the processor 40, whereby the device 1, 2 is operative to: perform one or more one-dimensional beam sweeps in a first direction, perform one or more one-dimensional beam sweeps in a second direction, and determine a two-dimensional beam based on at least one one-dimensional sweep in the first direction and at least one one-dimensional sweep in the second direction.

In an embodiment, the device 1, 2 is configured to determine by:
  selecting one of the one-dimensional beam sweeps in the first direction and one one-dimensional beam sweep in the second direction, and
  determining a pointing direction for use in transmission or reception based on the respective pointing directions of the selected one-dimensional beams.

In an embodiment, the device 1, 2 is configured to refine the determined two-dimensional beam by performing a two-dimensional beamsearch using one or more two-dimensional beams based on the determined two-dimensional beam.

In various embodiments, the device 1, 2 is configured to use a first analog antenna panel 10 for the one-dimensional beam sweeps in the first direction and a second analog antenna panel 20 for the one-dimensional beam sweeps in the second direction.

In various embodiments, the device 1, 2 is configured to simultaneously perform the one or more one-dimensional beam sweeps in the first direction and in the second direction.

In various embodiments, the device 1, 2 is configured to adjust beamwidth of the one-dimensional beam sweeps in a direction essentially orthogonal to the first direction.

In various embodiments, the device 1, 2 is configured to adjust beamwidth of the one-dimensional beam sweeps in a direction essentially orthogonal to the second direction.

In various embodiments, the device 1, 2 is configured to adjust based on one or more of: an angular interval within which the beam sweep in the orthogonal direction is to be performed, link budget and channel conditions on a channel to which the device 1, 2 has a wireless link.

In various embodiments, the first direction is essentially orthogonal to the second direction.

In various embodiments, a beamwidth of the one-dimensional beam sweeps is broader in a direction orthogonal to a sweep direction than in the sweep direction.

In various embodiments, the device 1, 2 is configured to broaden the one-dimensional beam sweeps in a direction orthogonal to the first direction and the second directions, respectively, by using one or more of: amplitude tapering, phase tapering and dual-polarization beamforming.

In various embodiments, the device 1, 2 is a wireless communication device 1.

In various embodiments, is an access point 2 for wireless communications.

The device 1, 2 may thus be configured to perform the method 30 according to any of the described embodiments.

Figure 8:
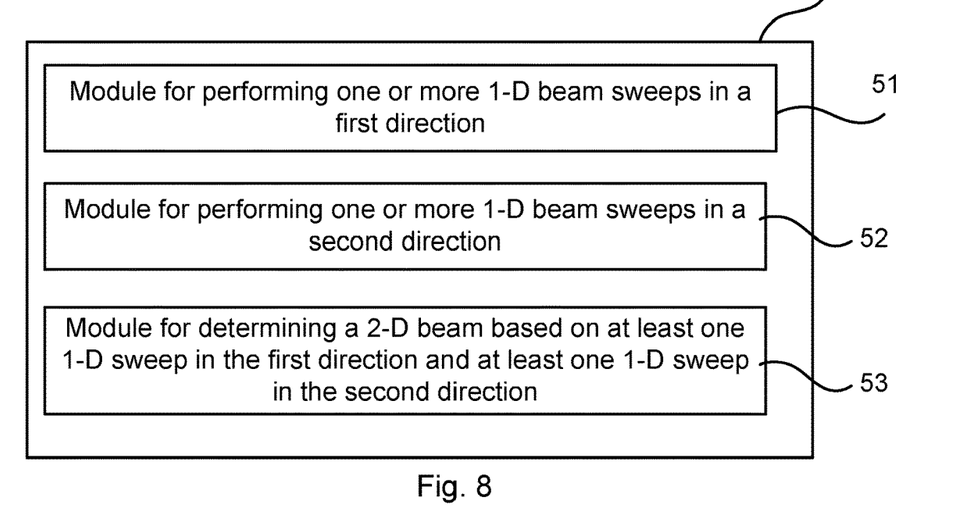
FIG. 8 illustrates a device comprising function modules/software modules for implementing embodiments in accordance with the present teachings.

FIG. 8 illustrates a device 1, 2 comprising function modules/software modules for implementing embodiments in accordance with the present teachings.

A device 1, 2 is provided for analog beamfinding. The device comprises a first module 51 for performing one or more one-dimensional beam sweeps in a first direction. The first module 51 may, for instance, comprise processing circuitry and at least part of an analog antenna panel 10, 20, wherein the processing circuitry is adapted to cause the analog antenna panel to perform one or more one-dimensional beam sweeps in a first direction.

The device comprises a second module 52 for performing one or more one-dimensional beam sweeps in a second direction. The second module 52 may, for instance, comprise processing circuitry and at least part of an analog antenna panel 10, 20, wherein the processing circuitry is adapted to cause the analog antenna panel to perform one or more one-dimensional beam sweeps in a second direction.

The device comprises a third module 53 for determining a two-dimensional beam based on at least one one-dimensional sweep in the first direction and at least one one-dimensional sweep in the second direction. The third module 53 may, for instance, comprise processing circuitry adapted to perform such determination.

It is noted that one or more modules 51, 52, 53 may be replace by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for analog beamfinding performed by a device, the method comprising:
   performing one or more one-dimensional beam sweeps in a first direction;
   performing one or more one-dimensional beam sweeps in a second direction;
   determining a two-dimensional beam based on at least one one-dimensional sweep in the first direction and at least one one-dimensional sweep in the second direction, wherein the determining comprises:
      selecting one of the one-dimensional beam sweeps in the first direction and one of the one-dimensional beam sweeps in the second direction; and
      determining a pointing direction for use in transmission or reception based on the respective pointing directions of the selected one-dimensional beams; and
   refining the determined two-dimensional beam by performing a two-dimensional beamsearch using one or more two-dimensional beams based on the determined two-dimensional beam.

2. The method as claimed in claim 1, comprising using a first analog antenna panel for the one-dimensional beam sweeps in the first direction and a second analog antenna panel for the one-dimensional beam sweeps in the second direction.

3. The method as claimed in claim 1, comprising simultaneously performing the one or more one-dimensional beam sweeps in the first direction and in the second direction.

4. The method as claimed in claim 1, wherein the performing comprises adjusting beamwidth of the one-dimensional beam sweeps in a direction essentially orthogonal to the first direction.

5. The method as claimed in claim 1, wherein the performing comprises adjusting beamwidth of the one-dimensional beam sweeps in a direction essentially orthogonal to the second direction.

6. The method as claimed in claim 4, wherein the adjusting comprises one or more of: an angular interval within which the beam sweep in the orthogonal direction is to be performed, link budget and channel conditions on a channel to which the device has a wireless link.

7. The method as claimed in claim 1, wherein the first direction is essentially orthogonal to the second direction.

8. The method as claimed in claim 1, wherein a beamwidth of the one-dimensional beam sweeps is broader in a direction orthogonal to a sweep direction than in the sweep direction.

9. The method as claimed in claim 1, wherein the performing comprises broadening the one-dimensional beam sweeps in a direction orthogonal to the first direction and the second directions, respectively, by using one or more of: amplitude tapering, phase tapering and dual-polarization beamforming.

10. The method as claimed in claim 1, wherein the device is a wireless communication device.

11. The method as claimed in claim 1, wherein the device is an access point for wireless communications.

12. A computer program product comprising a non-transitory computer readable medium storing a computer program comprising instructions which, when executed on at least one processor of the device, causes the at least one processor to carry out the method according to claim 1.

13. A device for analog beamfinding, the device being configured to:
- perform one or more one-dimensional beam sweeps in a first direction;
- perform one or more one-dimensional beam sweeps in a second direction;
- determine a two-dimensional beam based on at least one one-dimensional sweep in the first direction and at least one one-dimensional sweep in the second direction, wherein the determining comprises:
  - select one of the one-dimensional beam sweeps in the first direction and one of the one-dimensional beam sweeps in the second direction; and
  - determine a pointing direction for use in transmission or reception based on the respective pointing directions of the selected one-dimensional beams; and
- refine the determined two-dimensional beam by performing a two-dimensional beamsearch using one or more two-dimensional beams based on the determined two-dimensional beam.

\* \* \* \* \*